United States Patent [19]

Higa

[11] Patent Number: 4,985,060

[45] Date of Patent: Jan. 15, 1991

[54] SOIL CONDITIONERS

[75] Inventor: Teruo Higa, Ginowan, Japan

[73] Assignees: Saken Corporation; Corporation Limited Rioko, both of Japan

[21] Appl. No.: 427,910

[22] Filed: Oct. 24, 1989

Related U.S. Application Data

[63] Continuation of Ser. No. 127,512, Nov. 30, 1987, abandoned, which is a continuation of Ser. No. 879,951, Jun. 30, 1986, abandoned.

[30] Foreign Application Priority Data

Jul. 4, 1985 [JP] Japan ................... 60-147391
Jul. 5, 1985 [JP] Japan ................... 60-147728

[51] Int. Cl.$^5$ .................. C05F 11/08; C05G 3/04
[52] U.S. Cl. ............................ 71/6; 71/11; 71/27; 71/903; 106/DIG. 1
[58] Field of Search ............ 71/6, 7, 902, 903; 106/DIG. 1

[56] References Cited

U.S. PATENT DOCUMENTS

| | | | |
|---|---|---|---|
| 4,134,775 | 1/1979 | Schwoegler | 106/DIG. 1 |
| 4,443,260 | 4/1984 | Miyoshi et al. | 106/109 |
| 4,464,200 | 8/1984 | Duval | 106/90 |
| 4,551,164 | 11/1985 | Tenzer | 71/6 |

FOREIGN PATENT DOCUMENTS

| | | | |
|---|---|---|---|
| 0141382 | 11/1981 | Japan | 71/903 |
| 0055986 | 4/1982 | Japan | 71/903 |

Primary Examiner—Ferris H. Lander
Attorney, Agent, or Firm—Nixon & Vanderhye

[57] ABSTRACT

The soil conditioner of this invention is basically composed of 4 to 4.75 parts by weight of coal ash, 4 to 4.75 parts by weight of slag, and 0.5 to 2 parts by weight of zeolite, and is useful for the overall improvement of soil including not only chemical and physical conditioning of the soil but also improvement of its ecological system. In addition to the aforesaid ingredients, this soil conditioner may contain a microorganism having the function of competing with the harmful microorganisms present in the soil or utilizing them as nutrient sources to eliminate the detrimental effects thereof, thereby inducing the propagation of useful microorganisms in the rhizosphere of the desired crop and promoting the growth of the crop, as well as 0.2 to 2% by weight of molasses based on the total weight of the coal ash, slag and zeolite.

20 Claims, No Drawings

SOIL CONDITIONERS

This is a continuation of application Ser. No. 07/127,512, filed Nov. 30, 1987, now abandoned which is a continuation of Ser. No. 879,951, filed 6/30/86 and now abandoned.

BACKGROUND OF THE INVENTION

1. Field of the Invention

This invention relates to a soil conditioner which consists essentially of inorganic materials and, according to need, may contain microorganisms capable of eliminating detrimental effects of harmful microorganisms more effectively from the rhizosphere of a crop.

2. Description of the Prior Art

The purposes of soil improvement include the chemical conditioning of the soil mainly comprising the adjustment of pH and the balancing of inorganic nutrients, the physical conditioning of the soil mainly comprising the improvement of water permeability, air permeability and water retention properties, and the improvement of the ecological system concerning the activity of useful microorganisms in the soil.

In the prior art, a variety of soil conditioners are known. However, they are all effective in accomplishing one or two of the aforesaid purposes, and no soil conditioner that can comprehensively answer all of the aforesaid purposes is known as yet.

For example, it is common practice to improve a soil by use of slag or coal ash. Since slag and coal ash are strongly alkaline, they serve for the improvement of an acid soil, but tend to damage crops by alkali soil (which will be hereinafter referred to as alkali damage). If the amount of slag or coal ash added is decreased to avoid such a disadvantage, the soil will return to an acid state in a short period of time and the effect of the slag or coal ash will not last satisfactorily.

Moreover, slag is also disadvantageous in that the soil to which slag has been applied becomes hard because of the hydraulic nature of the slag.

Furthermore, slag and coal ash have the additional disadvantage of having low fertilizer-retaining power. In the soil to which they have been applied, therefore, the fertilizers tend to be carried away by rainwater or sprinkled water.

As a method for the physical conditioning of the soil, it is well known to disperse and mix foamed polystyrene particles in a soil. However, this only serves to provide the soil with voids. Accordingly, in case of a heavy rain or an abundant water sprinkling, the draining ability of the soil is unduly enhanced owing to the presence of such voids. As a result, the foamed polystyrene particles may often rise to the surface of the soil to lose its soil-conditioning effect and, moreover, cause the fertilizers to be carried away together with them.

A soil activator comprising soil microorganisms adsorbed to vermiculite or the like is disclosed, for example, in Japanese Patent Laid-Open No. 40723/'80. However, this is not satisfactorily effective in decomposing or adsorbing harmful substances (including ethylene and other hydrocarbons detrimental to crops, certain hydrocarbons and hydrogen sulfide which promote the propagation of harmful microorganisms) and thereby inhibiting the detrimental effects thereof. Moreover, this soil activator is also inadequate for the prevention of damage caused by continuous cropping.

At present, the development of various types of soil conditioners has made it relatively easy to achieve the chemical and physical conditioning of the soil. However, it is the existing state of the art that a soil conditioner having an overall effect including an improvement of the ecological system of the soil has not been provided as yet. In particular, the prevention of damage caused by continuous cropping is the most important problem with modern agriculture is confronted. In order to solve this problem, a soil conditioner having an overall effect as described above is required, but none of the prior art soil conditioners can perform such a function. Thus, there is a strong demand for the development of a soil conditioner having an overall effect which is especially effective in the prevention of damage caused by continuous cropping.

SUMMARY OF THE INVENTION

It is an object of the present invention to provide a soil conditioner which can overcome the above-described various disadvantages of prior art soil conditioners and which is useful for the overall improvement of soil including not only chemical and physical conditioning of the soil but also improvement of the ecological system of the soil.

It is another object of the present invention to provide a soil conditioner which can prevent damage caused by continuous cropping.

These objects of the present invention can be accomplished by a soil conditioner comprising 4 to 4.75 parts by weight of coal ash, 4 to 4.75 parts by weight of slag, and 0.5 to 2 parts by weight of zeolite.

More specifically, the soil conditioner of the present invention having the above-described composition is characterized by the facts that the coal ash and the slag are present in such an appropriate proportion as to provide a good balance of inorganic fertilizer elements, that the combined use of zeolite serves to prevent alkali damage in spite of the presence of strong alkali, and that the effect of the alkali lasts long. The coal ash and slag contained in the soil conditioner of the present invention are free from various harmful microorganisms, because they have been exposed to high temperatures at their preparation. Moreover, the zeolite and the slag and coal ash from which the alkali has been removed form porous bodies having ion-exchange capacity, and provide a habitat for useful microorganisms.

Moreover, since this soil conditioner has porosity, it can bring about a moderate improvement in the air permeability and water permeability of the soil.

Furthermore, where this soil conditioner contains, in addition to the aforesaid inorganic ingredients, molasses and microorganisms having the function of competing with harmful microorganisms (including fusaria, rhizoctonias, pythiums, and other microorganisms causative of underground and aboveground plant diseases) present in soil or utilizing them as nutrient sources and thereby eliminating their detrimental effects, they cooperate with the aforesaid inorganic ingredients to induce the more effective propagation of useful microorganisms in the rhizosphere of the desired crop, control the activity of the harmful microorganisms in the soil, and further eliminate their detrimental effects therefrom. The microorganisms added to this soil conditioner can be stably retained by the aforesaid inorganic ingredients not only before its use but also after its application to a soil. The addition of molasses is not only effective in preventing the soil from becoming hard owing to the hydraulic nature of the slag and the coal ash, but also has the remarkable effect of inducing the propagation of the added microorganisms and plays an important role in establishing its dominance in the soil.

Thus, the soil conditioner of the present invention is useful for the overall improvement of soil including not only chemical and physical conditioning of the soil but also improvement of the ecological system of the soil. In particular, it is effective in preventing damage caused by continuous cropping which is closely associated with the activity of harmful microorganisms.

DETAILED DESCRIPTION OF THE PREFERRED EMBODIMENTS

The soil conditioner of the present invention comprises 4 to 4.75 parts by weight of coal ash, 4 to 4.75 parts by weight of slag, and 0.5 to 2 parts by weight of zeolite.

Coal ash for use in the present invention is rich in boron and potassium, while slag is rich in calcium and magnesium, but poor in boron and potassium. Thus, a combination of them can provide a good balance of inorganic fertilizer elements. However, when used alone, this combination fails to overcome the disadvantage of tending to cause alkali damage, hardening the soil owing to its hydraulic nature, and having poor fertilizer-retaining power. Nevertheless, the soil conditioner further containing 0.5 to 2% by weight of zeolite does not cause any alkali damage even when it is amply applied to a soil, and can maintain the alkalinity of the soil for a long period of time.

Moreover, in contrast to vermiculite as used in Japanese Patent Laid-Open No. 40723/'80, zeolite has not only high ion-exchange capacity, but also the beneficial function of decomposing or adsorbing harmful substances (including ethylene and other hydrocarbons detrimental to crops, hydrocarbons and hydrogen sulfide which promote the propagation of harmful microorganisms, and the like) and thereby minimizing the detrimental effects thereof.

The coal ash and the slag are preferably used in a weight ratio of 1:0.5–2 and more preferably in a weight ratio of approximately 1:1. As the coal ash, there may be used any finely powdered coal ash that is being commonly used in the field of soil conditioners and the like. As the slag, there may be used blast furnace slag, converter slag or electric furnace slag. However, blast furnace slag is preferred from the viewpoint of its composition. The slag is preferably in the form of fine granules, and it is preferable to use granulated slag having a particle diameter of the order of 0.2 to 2 mm.

The zeolite is preferably in powder form.

If the amount of zeolite added is less than 0.5% by weight, the aforesaid effects of the zeolite addition will not be produced to the fullest extent. If it is greater than 2%, no additional benefit will be gained, but only an increase in cost will result.

The soil conditioner of the present invention can be prepared simply by mixing the above-described ingredients in the aforesaid proportions and blending them homogeneously.

The soil conditioner of the present invention having the above-described composition is characterized by the facts that the coal ash and the slag are present in such an appropriate proportion as to provide a good balance of inorganic fertilizer elements, that the combined use of zeolite serves to prevent alkali damage in spite of the presence of strong alkali, and that the effect of the alkali lasts long. Moreover, the hydraulic reaction of the slag and the coal ash is also prevented. Furthermore, the coal ash and the slag are both free from various microorganisms because they have been exposed to high temperatures. In addition, the zeolite and the slag and coal ash from which the alkali has been removed form porous bodies having ion-exchange capacity, and their pores create an environment suitable for the inhabitation of useful microorganisms present in soil. Thus, the pores into which the useful microorganisms penetrate can provide a habitat for these microorganisms and can form a base for their action in the soil.

Moreover, since the zeolite and the slag have the aforesaid function of decomposing and adsorbing harmful substances, they can inhibit the detrimental effects of such harmful substances on crops. Furthermore, this decomposition and adsorption function also inhibits the action of substances promoting the growth of harmful microorganisms (in particular, anaerobic bacteria) which constitutes a cause for damage from continuous cropping, and the inorganic ingredients creates an environment convenient for the propagation of useful microorganisms. Thus, the soil conditioner of the present invention is effective in eliminating the detrimental effects of harmful microorganisms and thereby minimizing damage from continuous cropping.

Since the soil conditioner of the present invention comprises porous bodies, it is moderately improved in air permeability and water permeability and enhanced in fertilizer-retaining power. Moreover, since the soil conditioner of the present invention has the form of hygroscopic powder or sand, it can be easily applied to a soil without being unduly scattered by the wind.

In addition to the aforesaid inorganic ingredients, the soil conditioner of the present invention may further contain microorganisms which function to compete with harmful microorganisms present in soil and defeat them or utilize them as nutrient sources and finally eliminate their detrimental effects, thereby inducing the propagation of useful microorganism in the rhizosphere of the desired crop and promoting the growth of the crop, as well as 0.2 to 2% by weight of molasses based on the total weight of the coal ash, slag and zeolite. As a result of this makeup, the added microorganisms and the molasses cooperate with the aforesaid inorganic ingredients to induce the more effective propagation of useful microorganisms in the rhizosphere of the crop, control the activity of harmful microorganisms, and further eliminate such harmful microorganisms.

The microorganisms contained in the soil conditioner of the present invention can be any microorganism that performs the above-described functions. It would be more efficient to use microorganisms which themselves serve as useful microorganisms.

The aforesaid inorganic ingredients function as a base material to which the added microorganisms is to be adsorbed, and the microorganisms are stably retained in the porous bodies formed of these inorganic ingredients and having ion-exchange capacity.

The added microorganisms preferably comprise a combination of an actinomycete and a photosynthetic bacterium.

Photosynthetic bacteria which can be adsorbed to the base material consisting of the inorganic ingredients in the practice of the present invention include, for example, members of the family Rhodospirillaceae such as *Rhodospirillum rubrum, Rhodospirillum tenue, Rhodospirillum fulvum, Rhodospirillum molischianum, Rhodospi-* rillum photometricum, Rhodopseudomonas palustris, Rhodopseudomonas gelatinosa, Rhodopseudomonas capsulata, Rhodopseudomonas viridis, Rhodopseudomonas acidophila, Rhodopseudomonas sphaeroides, Rhodomicrobium vannielii, etc.; members of the family Chromatiaceae such as Chromatium vinosum, Chromatium okenii, Chromatium warmingii, Chromatium bunderi, Chromatium minus, Chromatium violascens, Chromatium weissei, Chromatium gracile, Thiocystis galatinosa, Thiocystis violacea, Thiospirillum sanguineum, Thiospirillum jenense, Thiospirillum rosenbergii, etc.; and the like. Among others, so-called purple non-sulfur bacteria belonging to the genera Rhodospirillum and Rhodopseudomonas are preferred. Moreover, it is preferable to use two or more species or strains of these bacteria, because they form a stabler mixed system with an actinomycete.

As the actinomycete, there may be used a variety of actinomycetes which produce and secrete lactic acid and are usually found in soil or fully fermented compost. Such actinomycetes include, for example, members of the genera Actinomyces, Nocardia, Thermomonospora, Micromonospora, Pseudonocardia, Chainia, Streptomyces, Actinoplanes, Streptosporangium and Agromyces. These actinomycetes should preferably be non-pathogenic.

These microorganisms inhabit the porous bodies formed of the aforesaid inorganic ingredients. When applied to a soil, they compete with the harmful microorganisms present in the soil or utilize them as nutrient sources to eliminate the detrimental effects thereof. In this manner, they themselves propagate as useful microorganisms or facilitate the propagation of other useful microorganisms in the soil, thereby promoting the growth of the desired crop.

Accordingly, it is to be understood that any of the actinomycete and photosynthetic bacteria performing such functions can be used without being limited to the above-enumerated genera or species.

Antinomycetes produce antibiotics or propagate by utilizing harmful microorganisms as nutrient sources, thus serving to eliminate the detrimental effects of the harmful microorganisms. Photosynthetic bacteria produce cytokinin and vitamin C precursors promoting cell division, fix atmospheric nitrogen, and further symbiose with azotobacters, which are notrogen-fixing bacteria found in the soil, and contribute to the fixation of more nitrogen (for example, 3 to 4 times as much nitrogen as usual). Moreover, they play a role in converting volatile hydrocarbons, hydrogen sulfide and similar compounds, which are injurious to the roots of crops, to substances useful for the crops, such as carbohydrates, amino acids and the like. Furthermore, photosynthetic bacteria and certain actinomycetes (such as actinomyces) not only secrete various amino acids useful for the growth of plants, but also accumulate such useful amino acids within the cells. Thus, their dead cells serve as a highly effective fertilizer.

When an actinomycete or a photosynthetic bacterium is used alone, it may often fail to defeat harmful microorganisms present in the soil and propagate there. A certain actinomycete, when used alone, may seem to be effective at the beginning, but its effect will not last long.

In contrast, when a combination of an actinomycete and a photosynthetic bacterium is used in the soil conditioner of the present invention, these bacteria interact with each other to form a stable system, and their respective functions can be performed efficiently. Moreover, since the aforesaid inorganic ingredients included in the soil conditioner of the present invention comprise porous bodies, the aforesaid bacteria can be adsorbed in their pores to form a stable mixed system thereof. As a result, not only before use of the soil conditioner but also after its application to a soil, the pores can stably retain the mixed system of the bacteria and provide a base for their action. For example, even when harmful microorganisms are dominant in the soil, they cannot invade the pores of the porous bodies because a stable mixed system of the aforesaid bacteria is formed therein. Thus, the bacteria constituting this mixed system can stay or remain stably in the pores. As a result, even when the power of the harmful microorganisms is strong, the useful microorganisms can gradually propagate from the pores into the soil, extend their power, and eventually defeat the harmful microorganisms.

Where the soil conditioner of the present invention contains microorganisms, it utilizes the ability of the microorganism to eliminate the aforesaid detrimental effects of harmful microorganisms from the area to which this soil conditioner is applied, and does not utilize certain properties peculiar to any specific strain. In other words, the microorganism used in the soil conditioner of the present invention is not restricted to a specific strain. Accordingly, where both a photosynthetic bacterium and an actinomycete are to be used, it is possible to use any desired combination of strains.

The soil conditioner of the present invention may further contain microorganisms other than those described above, and various additives facilitating the action of the added microorganisms.

Such microorganisms include lactic acid bacteria, yeasts, useful mold fungi such as members of the genera Trichoderma and Penicillium, and the like, and such additives include molasses, fish broth and other materials serving as nutrient sources for the added microorganisms.

Any lactic acid bacterium may be added to the soil conditioner of the present invention, but it is preferable to use one which does not induce the formation of butyric acid. Such a lactic acid bacterium may be selected from ones commonly used in lactic acid fermentation, and examples thereof include members of the genus Streptococcus such as Streptococcus lactis, Streptococcus thermcphilus, Streptococcus faecalis, treptococcus cremoris, Streptococcus diacetilactis, etc.; members of the genus Leuconostoc such as Leuconostoc mesenteroides, Leuconostoc dextranicum, Leuconostoc citrovorum, etc.; members of the genus Pediocuccus such as Pediocuccus cerevisiae, Pediocuccus acidilactici, etc.; members of the genus Lactobacillus such as Lactobacillus bulgaricus, Lactobacillus acidophilis, Lactobacillus plantarum, Lactobacillus delbrukii, Lactobacillus lactis, Lactobacillus casei, etc.; and the like.

Similarly, any of various yeasts may be added to the soil conditioner of the present invention. Examples of such yeasts include members of the genus Saccharomyces such as Saccharomyces cerevisiae, Saccharomyces uvarum, Saccharomyces faecalis, Saccharomyces fragilis, Saccharomyces lactis, etc.; members of the genus Candida such as Candida utilis, Candida tropicalis, Candida rugosa, Candida peculirosa, etc.; and the like.

Prior to the action of the photosynthetic bacterium and the actinomycete, the lactic acid bacterium functions to secrete a strong acid and thereby destroy the harmful microorganisms or weaken their activity. It also functions to convert lignin and tannin, which can hardly be utilized by plants, to useful substances.

Generally, photosynthetic bacteria and lactic acid bacteria are anaerobic, actinomycetes are aerobic, and lactic acid bacteria secrete lactic acid which is a strong acid. Accordingly, when a lactic acid bacterium is added to the aforesaid photosynthetic bacterium and actinomycete, they will usually be unable to coexist and propagate together in a liquid medium. However, in the soil conditioner of the present invention including the aforesaid combination of inorganic ingredients, such microorganisms can coexist stably in the porous bodies formed of the inorganic ingredients. As a result, the functions of the respective microorganisms can be fully utilized to produce more excellent effects.

The yeast, together with the molasses, provides a nutrient source for the aforesaid added microorganisms and also serves to stabilize the mixed system of the aforesaid microorganisms. The molasses is added so that the slag and the coal ash may not harden and, at the same time, the added microorganisms may propagate uniformly and rapidly. These purposes can be fully achieved by using the molasses in an amount of 0.2 to 2% by weight based on the weight of the base inorganic material. Since the slag and the coal ash are in a substantially sterile condition as a result of exposure to high temperatures at their preparation and strongly alkaline, the addition of molasses involves no risk of inducing the growth of undesired microorganisms in the soil conditioner.

The soil conditioner of the present invention can be prepared, for example, according to the following procedure:

1. A yeast is added to a culture medium containing molasses, urea, fish meal, animal excrements, etc. (provided that the fish meal and the animal excrements should previously be sterilized by heat treatment), and grown under aerated conditions.
2. A portion of this culture is taken out. An actinomycete and a photosynthetic bacterium are added thereto and grown at 40 to 50° C with forced aeration under illumination with sunlight or incandescent lamps. The resulting culture is adsorbed to zeolite.
3. The same photosynthetic bacterium is added to another portion of the culture obtained in step 1, and grown under anaerobic conditions. The resulting culture is adsorbed to zeolite.
4 The microorganism-bearing zeolite obtained in step 2 and the microorganism-bearing zeolite obtained in step 3 are blended with a mixture of coal ash and slag to which molasses has been added in an amount of 0.2 to 2% by weight based on the weight of the base inorganic material.

The proportions of the added yeast, actinomycete and photosynthetic bacterium used in step 2 are preferably 30–70:15–35:15–35, more preferably 40–60:20–30:20–30, as expressed by the ratio of the inoculated volumes of the saturated cultures of the respective seed microorganisms. The zeolite obtained in step 2 and the zeolite obtained in step 3 are mixed preferably in such a ratio that the proportion of the actinomycete to the photosynthetic bacterium is 1:2–4 based on the added microorganisms to each zeolite. They may further be mixed with zeolite to which one or more useful microorganisms such as mold fungi and nitrogen-fixing bacteria are adsorbed.

Where a lactic acid bacterium is to be used, it may be introduced by mixing it with the actinomycete and/or the photosynthetic bacterium in the aforesaid step 2 or 3, or by adding it to still another portion of the culture obtained in step 1, growing it separately, and adsorbing the resulting culture to zeolite.

The soil conditioner so prepared has, in addition to the previously described effects derived from its inorganic ingredients, the following additional effects.

The zeolite has specific microorganisms which are adsorbed to the zeolite and which have the function of competing with the harmful microorganisms present in the soil to which the soil conditioner is to be applied and thereby eliminating detrimental effects of them. Since the zeolite mixed with the slag and the coal ash is moderately alkaline and free from any other competitive microorganism, this soil conditioner provides a set of conditions suitable for the dormancy of the microorganisms adsorbed to the zeolite and permit them to be stably retained there for a long period of time. As soon as this soil conditioner is applied to the soil, the microorganisms adsorbed to the zeolite begin to propagate and spread into the soil, and function to eliminate detrimental effects of harmful microorganisms therefrom. For example, where a yeast is used as in the above-described case, the yeast grows actively in the soil owing to the added molasses and fish broth, allowing the stable propagation of useful microorganisms including actinomycetes and photosynthetic bacteria.

In addition to the direct elimination of harmful microorganisms, the microorganisms adsorbed to the zeolite cooperate with the ability of the slag and the zeolite to exchange ions and to decompose harmful hydrocarbons, and show the effect of preventing the production of hydrocarbons and hydrogen sulfide promoting the propagation of harmful anaerobic bacteria and thereby minimizing damage from continuous cropping. Moreover, this soil conditioner is highly effective in controlling nematodes.

The addition of molasses is not only effective in preventing the soil from becoming hard owing to the hydraulic nature of the slag and the coal ash, but also has the remarkable effect of inducing the propagation of the added microorganisms without any growth of undesired microorganisms and plays an important role in establishing their dominance in the soil.

When the actinomycete- and photosynthetic bacterium-bearing zeolite obtained in the aforesaid step 2 is mixed with the anaerobically cultured photosynthetic bacterium-bearing zeolite obtained in the aforesaid step 3, the resulting soil conditioner is characterized by being much more effective in controlling nematodes than that prepared without using the zeolite obtained in step 3.

The present invention is further illustrated by the following examples. However, these examples are not to be construed to limit the scope of the invention.

EXAMPLE 1

45 kg of granulated blast furnace slag (with a particle diameter of 0.1–2 mm), 45 kg of coal ash and 10 kg of zeolite (with a particle diameter of 0.1 mm or less) were homogeneously blended in a mixer to obtain a soil conditioner.

The soil conditioner thus obtained was applied to a strongly acid, heavy red clay soil found at Onna-Mura in the northern part of the main island of Okinawa in an amount of 30 kg per are. This soil was tilled and used for the cultivation of sugarcane and spinach. This procedure was repeated after a year by using the same soil conditioner in an amount of 10 kg per are, and after an additional year by using it in an amount of 5 kg per are. The result thus obtained are shown in Table 1.

TABLE 1

| | Year | pH | Sugar content (%) | Yield (kg) |
|---|---|---|---|---|
| Sugarcane | | | | |
| Treated plot | 1 | 5.8 | 18.5 | 980 |
| | 2 | 6.0 | 19.0 | 1350 |
| | 3 | 5.9 | 18.0 | 1240 |
| Untreated plot | 1 | 4.5 | 17.4 | 670 |
| | 2 | 4.3 | 18.0 | 730 |
| | 3 | 4.1 | 17.1 | 610 |
| Spinach | | | | |
| Treated plot | 1 | 6.1 | | 180 |
| | 2 | 6.3 | | 210 |
| | 3 | 6.1 | | 215 |
| Untreated plot | 1 | 5.4 | | 130 |
| | 2 | 5.3 | | 110 |
| | 3 | 5.6 | | 94 |

EXAMPLE 2

In a greenhouse standing at Nishihara-Machi in the middle part of Okinawa Prefecture, having an alkali soil, and having been used for the repeated cultivation of tomato for 5 years, a soil conditioner prepared in the same manner as in Example 1 was tested by applying it to the soil in an amount of 30 kg per are and then cultivating tomato. The results thus obtained are shown in Table 2, which also includes the results obtained in an untreated plot for purposes of comparison.

TABLE 2

| | pH | EC | Yield (kg) | Damage from nematodes (%) |
|---|---|---|---|---|
| Treated plot | 8.1 | 0.13 | 1120 | Slight (5%) |
| Untreated plot | 8.2 | 0.41 | 450 | Severe (65%) |

As can be seen from these results, this soil conditioner proved to be effective not only for acid soils but also for alkali soils, and especially effective in controlling nematodes.

EXAMPLE 3

*Saccharomyces cerevisiae* (IFO 0304) was inoculated into 200 liters of an aqueous solution containing 2 kg of molasses, 100 g of urea and 2 kg of fish meal, and grown at 30° C. for 3 days under aerated conditions. A 120-liter portion of the resulting yeast culture was inoculated with equal quantities of an actinomycete, or *Streptosporangium roseum* (ATCC 12428), and three photosynthetic bacteria, or *Rhodopseudomonas gelatinosa* (ATCC 17011), *Rhodopseudomonas palustris* (ATCC 17001) and *Rhodopseudomonas sphaeroides* (IFO 12203). The resulting mixture was adjusted to pH 7.0 7.5 and incubated, with stirring, at 40–50° C. for 4 days under illumination with sunlight or incandescent lamps to obtain Culture I.

Separately, a 60-liter portion of the previously prepared yeast culture was inoculated with equal quantities of three photosynthetic bacteria, or *Rhodopseudomonas gelatinosa* (ATCC 17011), *Rhodopseudomonas palustris* (ATCC 17001) and *Rhodopseudomonas sephaeroides* (IFO 12203). The resulting mixture was incubated at 30° C for 4 days under anaerobic conditions to obtain Culture II. In addition, the remaining portion (20 liters) of the previously prepared yeast culture was inoculated with *Lactobacillus bulgaricus* (IFO 3533) and incubated at 30° C. for 2 hours under anaerobic conditions to obtain Culture III.

Then, Cultures, I, II and III were added to and mixed with 4.5 kg, 4.5 kg and 1 kg, respectively, of finely powdered zeolite, thereby causing the microbial cells to be adsorbed to the fine particles of zeolite. Thereafter, each portion of zeolite was collected and dried.

The microorganism-bearing zeolites thus obtained, 45 kg of granulated blast furnace slag and 45 kg of coal ash were homogeneously blended in a mixer to obtain a soil conditioner.

The soil conditioner thus obtained was applied to a strongly acid, heavy red clay soil found at Onna-Mura in the northern part of the main island of Okinawa in an amount of 30 kg per are. This soil was tilled and used for the cultivation of sugarcane and spinach. This procedure was repeated after a year by using the same soil conditioner in an amount of 10 kg per are, and after an additional year by using it in an amount of 5 kg per are. The results thus obtained are shown in Table 3.

TABLE 3

| | Year | pH | Sugar content (%) | Yield (kg) |
|---|---|---|---|---|
| Sugarcane | | | | |
| Treated plot | 1 | 6.0 | 21.9 | 1360 |
| | 2 | 6.1 | 23.2 | 1440 |
| | 3 | 6.0 | 22.8 | 1500 |
| Untreated plot | 1 | 4.1 | 17.4 | 670 |
| | 2 | 4.4 | 18.5 | 730 |
| | 3 | 4.5 | 17.0 | 710 |
| Spinach | | | | |
| Treated plot | 1 | 6.0 | | 270 |
| | 2 | 6.3 | | 310 |
| | 3 | 6.0 | | 290 |
| Untreated plot | 1 | 5.6 | | 94 |
| | 2 | 5.3 | | 118 |
| | 3 | 5.0 | | 110 |

EXAMPLE 4

In a greenhouse for the repeated cultivation of tomato standing at Nishihara-Machi in the middle part of Okinawa Prefecture and suffering serious damage from nematodes, a soil conditions prepared in the same manner as in Example 3 was tested by applying it to the soil in an amount of 30 kg per are and repeating the cultivation of tomato five times. The results thus obtained are shown in Table 4, which also includes the results obtained in an untreated plot for purposes of comparison.

TABLE 4

| | | First crop | Second crop | Third crop | Fourth crop | Fifth crop |
|---|---|---|---|---|---|---|
| Damage from nematodes % | Treated plot | 2 | 0 | 0 | 0 | 0 |
| | Untreated plot | 50 | 100 | 100 | 100 | 100 |
| Yield (kg) | Treated plot | 1020 | 1300 | 1420 | 1310 | 1520 |
| | Untreated plot | 430 | 210 | 100 | 95 | 120 |

Tomato is a crop which is very liable to damage from repeated cultivation (continuous cropping) and shows a marked decrease in yield even in the absence of nematodes. The results shown in Table 2 indicate that the soil conditioner of the present invention is significantly effective not only in controlling nematodes but also in preventing damage caused by repeated cultivation in the absence of nematodes.

EXAMPLE 5

A soil conditioner was prepared in the same manner as in Example 3, except that *Actinomyces bovis* (NCTC 5654) and *Streptomyces albus* (ATCC 3004) were used as actinomycetes, *Rhodospirillum rubrum* (IFO 3986), *Rhodopseudomonas viridis* (ATCC 19567) and *Chromatium buderi* (ATCC 25588) were used as photosynthetic bacteria, and *Streptococcus lactis* (IFO 12007) was used as a lactic acid bacterium.

According to the same procedure as in Example 3, this soil conditioner was tested in the cultivation of spinach. Thus, similar results as those of Example 3 were obtained.

EXAMPLE 6

*Saccharomyces cerevisiae* (IFO 0283) was inoculated into 200 liters of an aqueous solution containing 2 kg of molasses, 100 g of urea and 2 kg of fish meal, and grown at 30° C. for 3 days under aerated conditions. About two-thirds of the resulting yeast culture was inoculated with equal quantities of two actinomycetes, or *Agromyces ramosus* (ATCC 25173) and *Nocardioides albus* (ATCC 27980), and three photosynthetic bacteria, or *Rhodopseudomonas acidophila* (ATCC 25092), *Rhodospirillum tenue* (ATCC 19137) and *Rhodomicrobium vannielii* (ATCC 17100). The resulting mixture was adjusted to pH 7.0-7.5 and incubated, with stirring, at 40-50° C. for 4 days under illumination with sunlight or incandescent lamps. Separately, the remaining one-third of the aforesaid yeast culture was inoculated with equal quantities of the aforesaid three photosynthetic bacteria, and the resulting mixture was incubated at 30° C for 4 days under anaerobic conditions. These two cultures were added to and mixed with 5 kg each of finely powdered zeolite, thereby causing the microbial cells to be adsorbed to the fine particles of zeolite. Thereafter, each portion of zeolite was collected and dried. The microorganism-bearing zeolites thus obtained, 45 kg of granulated blast furnace slag and 45 kg of coal ash were intimately blended in a mixer to obtain a soil conditioner.

According to the same procedure as in Example 3, this soil conditioner was tested in the cultivation of sugarcane and spinach in a field having the same type of soil as employed in Example 3. The results thus obtained are shown in Table 5.

TABLE 5

|  | Year | pH | Sugar content (%) | Yield (kg) |
| --- | --- | --- | --- | --- |
| Sugarcane |  |  |  |  |
| Treated plot | 1 | 6.0 | 21.5 | 1310 |
|  | 2 | 6.1 | 23.0 | 1450 |
|  | 3 | 6.0 | 22.1 | 1480 |
| Spinach |  |  |  |  |
| Treated plot | 1 | 6.1 |  | 255 |
|  | 2 | 6.3 |  | 305 |
|  | 3 | 6.0 |  | 280 |

EXAMPLE 7

A soil conditioner was prepared in the same manner as in Example 3, except that *Candida utilis* (IFO 0369) was used in place of *Saccharomyces cerevisiae*, *Thermomonospora cruvata* (ATCC 19995) and *Micromonospora chalcea* (ATCC 12452) were used as actinomycetes, and *Rhodospirillum fulvum* (ATCC 15798) and *Chromatium warmingii* (ATCC 14959) were used as photosynthetic bacteria.

A soil inhabited by nematodes was placed in vats and the above soil conditioner was applied thereto in an amount of 300 g per square meter. Then, okra was cultivated in these vats. In the untreated group to which the soil conditioner was not applied, some abnormalities were noted in the aboveground part of all plants, and 50% of them died. However, in the treated group to which the soil conditioner was applied, as high as 40% of the plants showed no abnormalities and the death rate was only 18%. When the roots of each plant were examined, all plants had many root knots in the untreated group. In the treated group, however, 10% of the plants had no root knot, while 55% had root knots, but the number of root knots per plant was smaller than that observed in the untreated group. After all plants were removed from the soil conditioner applied vats, the same soil conditioner was applied in an amount of 200 g per square meter and okra was cultivated again. As a result, the plants showing no abnormalities were increased to 60% and the death rate was decreased to 12%.

EXAMPLE 8

A soil conditioner was prepared in the same manner as in Example 6, except that *Candida utilis* (IFO 0369) was used in place of *Saccharomyces cerevisiae*, and *Pseudonocardia thermophila* (ATCC 19285) and *Chainia antibiotica* (ATCC 15721) were used as actinomycetes, and *Rhodospirillum rubrum* (IFO 3986), *Rhodospirillum tenue* (ATCC 19137) and *Thiospirillum jenense* were used as photosynthetic bacteria.

According to the same procedure as in Example 4, this soil conditioner was tested in the repeated cultivation of tomato. The results thus obtained are shown in Table 6.

TABLE 6

|  |  | First crop | Second crop | Third crop | Fourth crop | Fifth crop |
| --- | --- | --- | --- | --- | --- | --- |
| Yield (kg) | Treated plot | 870 | 1240 | 1410 | 1280 | 1540 |

In the above-described Examples 3 to 8, the microorganisms were inoculated by preparing a suspension of seed microorganisms having a concentration of about $10^9$ cells per milliliter according to need and adding it to the culture medium in an amount of 0.1 to 10% by volume.

The strains used in the above described examples are deposited at the following agencies under the deposit number given in parentheses after the spicies name and readily available to everyone. The strains having an ATCC number are maintained in the American Type Culture Collection, 12301 Parklawn Drive, Rockville, Maryland 20852-1776, U.S.A.; those having an IFO number in the Fermentation Research Institute (Incorporated Foundation), 17-85, Juso-Motomachi 2-Chome, Yodogawa-ku, Osaka City, Japan; and those having an NCTC number in the Central Public Health Laboratory, Colindale Avenue, London, N.W. 9, England.

what is claimed is:

1. A granular soil conditioner consisting essentially of a porous, air and water permeable, homogeneous mixture of 4 to 4.75 parts by eight finely powdered coal ash, 4 to 4.75 parts by weight finely granulated slag, and 0.5 to 2 parts by weight powdered zeolite, the soil conditioner providing conditions amenable to maintain the microorganisms in a stable, dormant state for ann extended period of time prior to use, the soil conditioner having absorbed in its pores an actinomyceter and a photosynthetic bacterium adapted to compete with microorganisms in the soil harmful to plants or to utilize such plant-harmful microorganisms as a nutrient source and eliminate the plant harming effects of such microorganisms thereby providing plant-useful microorganisms to the soil to promote the growth of a desired crop in the soil to which the soil conditioner is added and wherein the soil conditioner remains unhardened and devoid of hydraulic reaction between the components of the soil conditioner.

2. A granular soil conditioner as claimed in claim 1, in which the slag is blast furnace slag.

3. A granular soil conditioner as claimed in claim 1, in which the coal ash and the slag are used in equal parts by weight.

4. A granular soil conditioner as claimed in claim 1, in which the finely granulated slag has a particle diameter of 0.2 to 2 mm.

5. A process of preparing a granular soil conditioner consisting essentially of a porous, air and water permeable, homogeneous mixture of 4 to 4.75 parts by weight finely powdered coal ash, 4 to 4.75 parts by weight finely granulated slag and 0.5 to 2 parts by weight powdered zeolite, the process comprising the steps of:

(a) adding yeast to a sterile culture medium and growing it under aerated conditions;

(b) removing a portion of the yeast culture grown in step (a) and adding to it an actinomycete and a photosynthetic bacterium and growing them with illumination and aeration;

(c) adsorbing the culture resulting from step (b) on a portion of the powdered zeolite;

(d) adding a photosynthetic bacterium to another portion of the culture grown in step (a) and growing it under anaerobic conditions;

(e) adsorbing the culture grown instep (d) on the remaining portion of the powdered zeolite; and (f) blending together the microorganism-bearing zeolite from step (c) and the microorganism bearing zeolite from step (e) with the finely powdered coal ash and finely granulated slag to produce the soil conditioner;

the soil conditioner providing conditions amenable to maintain the microorganisms in a stable, dormant state for an extended period of time prior to use, the actinomycete and the photosynthetic bacteria interacting with each other to form a stable microbial system adsorbing in the pores of the zeolite particles to gradually in use propagate from the zeolite pores into the soil and wherein the soil conditioner remains unhardened and devoid of hydraulic reaction between the components of the soil conditioner.

6. The process as claimed in claim 5, in which from 0.2 to 2% by weight of molasses, based on the total weight of the coal ash, slag and zeolite, is added in step (f), as a nutrient source.

7. The process as claimed in claim 5, in which the proportions of added yeast, actinomycete and photosynthetic bactrium are in the range of 30–70:15–35:-15–35, respectively, expressed as a ratio of the inoculated volumes of the saturated cultures of the respective seed microorganisms.

8. The process as claimed in claim 7, in which the proportions of added yeast, actinomycete and photosynthetic bacterium are in the range of 40–60:20–30:-20–30, respectively, expressed as a ratio of the inoculated volumes of the saturated cultures of the respective seed microorganisms.

9. The process as claimed in claim 5, in which the zeolite form step (c) and the zeolite from step (e) are mixed in a ratio such that the proportion of the actinomycete to the photosynthetic bacterium in the range of about 1:2–4 based upon the microorganisms added to each zeolite.

10. The process as claimed in claim 5, in which mold fungi are added to the soil conditioner.

11. The process as claimed in claim 5, in which nitrogen-fixing bacteria are added to the soil conditioner.

12. The process as claimed in claim 5, in which lactic acid bacteria are added to the soil conditioner.

13. The process as claimed in claim 12, in which the lactic acid bacteria does not induce the formation of butyric acid.

14. The process as claimed in claim 5, in which the slag is blast furnace slag.

15. The process as claimed in claim 5, in which the coil ash and slag are used in equal parts by weight.

16. The process as claimed in claim 5, in which the slag has a particle diameter of 0.2 to 2 mm.

17. A granular soil conditioner consisting essentially of a porous, homogeneous mixture of 4 to 4.75 parts by weight finely powdered coal ash, 4 to 4.75 parts by weight finely granulated slag, and 0.5 to 2 parts by weight powdered zeolite, the soil conditioner having absorbed in its pores a combination of an actinomycete and a photosynthetic bacterium.

18. A granular soil conditioner as claimed in claim 17, which further contains 0.2 to 2% by weight of molasses based on the total weight of coal ash, slag and zeolite.

19. A granular soil conditioner as claimed in claim 18, which further contains a yeast.

20. A granular soil conditioner as claimed in claim 18, which further contains a lactic acid bacterium.

* * * * *